United States Patent
Heise

Patent Number: 6,046,512
Date of Patent: Apr. 4, 2000

[54] CONNECTION OF A VOLTAGE REGULATOR IN A MOTOR VEHICLE POWER SUPPLY NETWORK

[75] Inventor: Andreas Heise, Morfelden, Germany

[73] Assignee: ITT Manufacturing Enterprises, Inc., Wilmington, Del.

[21] Appl. No.: 09/117,125

[22] PCT Filed: Jan. 20, 1997

[86] PCT No.: PCT/EP97/00242

§ 371 Date: Nov. 12, 1998

§ 102(e) Date: Nov. 12, 1998

[87] PCT Pub. No.: WO97/27660

PCT Pub. Date: Jul. 31, 1997

[30] Foreign Application Priority Data

Jan. 23, 1996 [DE] Germany .................... 196 02 171

[51] Int. Cl.[7] ........................................... H02J 7/00
[52] U.S. Cl. ............................................ 307/10.1; 307/66
[58] Field of Search ........................... 307/9.1, 10.1, 307/10.7, 66, 64, 43, 48, 18, 23, 25; 320/166, 167, 137

[56] References Cited

U.S. PATENT DOCUMENTS

| | | | |
|---|---|---|---|
| 5,331,211 | 7/1994 | Kondo et al. | 307/10.1 |
| 5,569,997 | 10/1996 | Berger | 307/66 |

FOREIGN PATENT DOCUMENTS

| | | |
|---|---|---|
| 175843 | 4/1986 | European Pat. Off. . |
| 246976 | 11/1987 | European Pat. Off. . |
| 574743 | 12/1993 | European Pat. Off. . |
| 0646498 | 4/1995 | European Pat. Off. . |
| 3441461 | 5/1985 | Germany . |
| 4109645 | 9/1992 | Germany . |
| 4227832 | 3/1993 | Germany . |
| 4343011 | 6/1995 | Germany . |

OTHER PUBLICATIONS

Search Report of the German Patent Office Relating to Parent German Patent Application 196 02 171.5 (Mar. 1996).

Pp. 107–111 from German Language Text relating to Diode Characteristics.

Pp. 151–153 from German Language Text—electronic circuit analysis reference.

*Primary Examiner*—Richard T. Elms
*Attorney, Agent, or Firm*—Rader, Fishman & Grauer PLLC

[57] ABSTRACT

The present invention discloses an external wiring of a voltage controller in the electrical system of an automotive vehicle, wherein the power input of the voltage controller is connected by way of a dual diode to the main line, which is connected to the positive pole of the battery, and to the auxiliary line which is connected to the positive pole of the electrical system by way of an ignition switch. The auxiliary line is connected to a buffer capacitor. When the voltage on the main line breaks down, the supply of the power input occurs by way of the auxiliary line or by means of a current discharging from the buffer capacitor. When the voltage on the auxiliary line breaks down, the supply of the signal input is effected by way of the buffer capacitor which is dimensioned to buffer the power input.

3 Claims, 1 Drawing Sheet

CONNECTION OF A VOLTAGE REGULATOR IN A MOTOR VEHICLE POWER SUPPLY NETWORK

TECHNICAL FIELD

The present invention relates to the wiring of a voltage controller in an electrical system of an automotive vehicle.

BACKGROUND OF THE INVENTION

The voltage controller has a power input, an output, and a signal input. The power input is connected to a voltage source, and the voltage controller supplies at the output a constant voltage which is independent of voltage variations at the input.

European patent application No. 0 646 498 discloses an electrical system of this type. In this application, among others, a controller which includes a volatile memory is connected to the main and auxiliary lines. When the voltage on the main line drops, the voltage at the input of the controller, to which the main line leads, is buffered by means of an auxiliary source, i.e., a rechargeable battery. Further, the main line is connected to the auxiliary line by way of two serially connected decoupling diodes in-between which the auxiliary line is connected. Buffering the voltage on the auxiliary line is not disclosed.

Voltage controllers of this type are necessary to ensure a safe operation of electronic controlling and regulating devices in automotive vehicles. For example, a controller may be concerned which is used to control a hydraulic brake system by which the vehicle wheels shall be prevented from locking.

Typically, the power input of the voltage controller is coupled by a diode to the main line of the electrical system. The main line is directly connected to the battery (or by way of a safety fuse). This main line is usually referred to as 'BAT'.

The input of the voltage controller is connected to the ground connection of the electrical system by way of a capacitor. The capacitor ensures that the power input of the voltage controller is fed with sufficient voltage even in the event of voltage breakdown on the main line, at least for a certain period (time of discharge of the capacitor).

Further, the voltage controller has a signal input which is connected to the auxiliary line of the electrical system. The auxiliary line is also connected to the positive pole of the battery by way of an ignition switch and is usually designated by the capital letters IGN (Ignition) in the automotive industry. When a voltage is applied to the signal input, an internal switch in the voltage controller is actuated, whereby the voltage controller is activated. The signal input is provided with a buffer capacitor, with the result that voltage breakdowns on the auxiliary line will not cause instantaneous deactivation of the voltage controller.

Shortcomings are involved with this external wiring of the voltage controller. Thus, two buffer capacitors are necessary, and the diodes connected upstream of the capacitors must be rated so that they can withstand the high charging current which occurs during activation.

Because increased temperature and voltage requirements are placed on both capacitors, it is not possible to increase the capacity of the capacitors as desired so that the length of the buffer time is limited. The result, in turn, is that voltage breakdowns of a long duration cause deactivation of the voltage controller.

In view of the above, an object of the present invention is to ensure by a simple external wiring of the voltage controller that in the event of voltage breakdowns, be it on the main line or the auxiliary line, the voltage controller remains active as long as possible so that the electronic components connected can be supplied with a constant voltage as long as possible.

This object is achieved by the present invention in that the auxiliary line is connected to the power input of the voltage controller additionally by way of a diode, and the diodes in the main line and in the auxiliary line are antiserially connected.

Consequently, this eliminates the need for the buffer capacitor that is normally provided on the main line because the buffer capacitor on the auxiliary line (adapted correspondingly), which is now the only one, may perform said purpose.

BRIEF DESCRIPTION OF THE DRAWING

The external wiring of a voltage controller 1 is shown in FIG. 1.

DETAILED DESCRIPTION OF THE PREFERRED EMBODIMENTS

Figure 1:
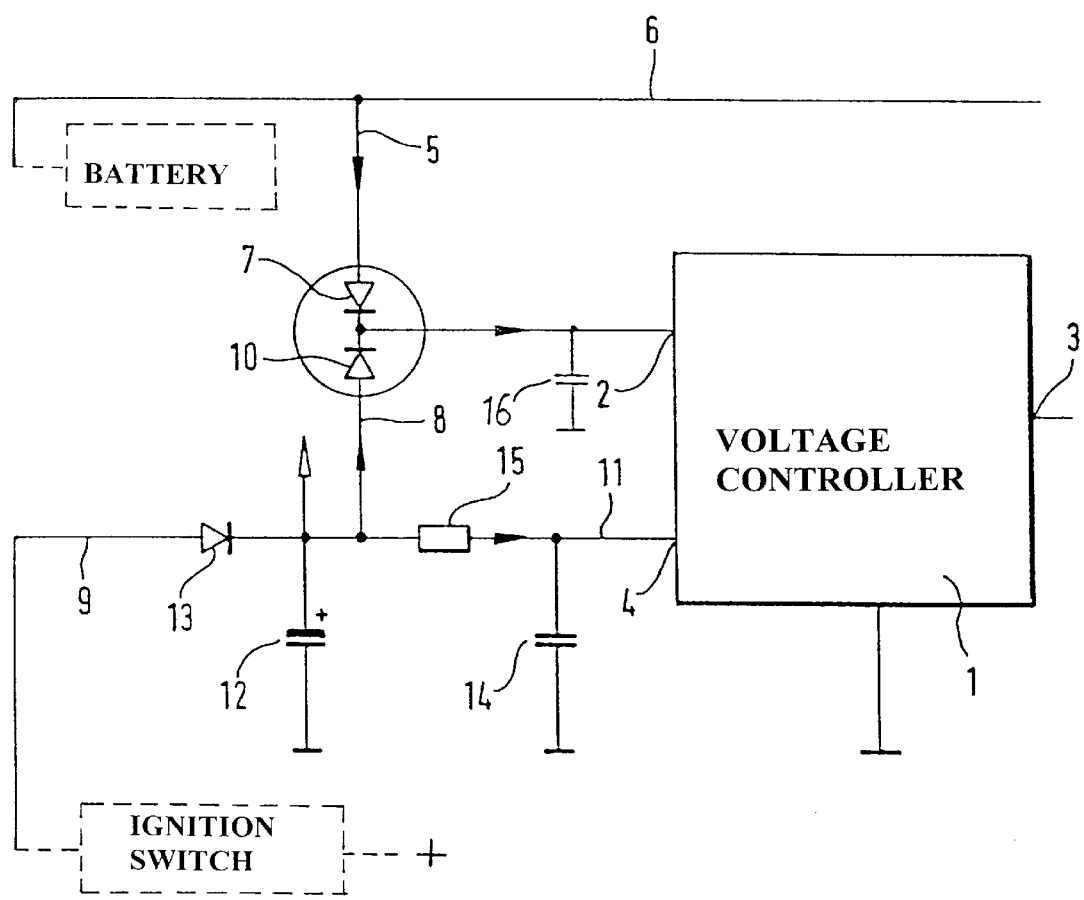

FIG. 1 shows a voltage controller 1 with a power input 2, an output 3 and a signal input 4. Further inputs and outputs may be provided. The power input 2 is directly (or by the intermediary of a safety fuse) connected to the positive pole of the electrical system by way of a line 5 linked to a main line 6. The power input 2 of the voltage controller 1 is connected by way of another line 8 to an auxiliary line 9 and also to the positive pole of the electrical system by way of an ignition switch (not shown). One diode 7, 10 each, which are antiserially connected, is inserted into the line 5 which leads to the main line 6 and into the line 8 which leads to the auxiliary line 9.

The result is that, depending on the line (main line 6 or auxiliary line 9) where the higher voltage prevails, the higher voltage is conducted to the power input 2. The individual diodes 7, 10 can also be configured as small signal dual diodes because no capacitor charging currents must flow through them.

The auxiliary line 9 is connected to the signal input 4 of the voltage controller 1 by way of another line 11. Line 8 is connected to the negative pole of the electrical system by way of a buffer capacitor 12. A diode 13 in the auxiliary line 9 prevents the charged capacitor 12 from decharging. The signal input 4 is protected against voltage peaks by a resistor/capacitor combination 14, 15. This protection device includes a resistor 15 in the line 11 and a capacitor 14 which connects the signal input 4 to the negative pole of the electrical system. The capacity of the protective capacitor is essentially lower than the one of the buffer capacitor 12. Thus, the resistor 15 and the capacitor 14 provide a conventional protective wiring arrangement which is not related to the proper idea of the present invention. Depending of the rating of the voltage controller, the provision of a small protective capacitor 16 (l.f.-range) on the power input 2 may also be appropriate.

The wiring scheme of the voltage controller operates as follows:

The voltage prevailing on the main line 6 is applied to the power input 2 of the voltage controller 1 by way of the diode 7. When the auxiliary line 9 is furnished with voltage by activation of the ignition switch, a voltage signal prevails at the signal input 4 as soon as the buffer capacitor 12 is charged. The charging time of the buffer capacitor 12 is short because line 9 (IGN) is low-ohmic.

As soon as a voltage signal is applied to the signal input 4, the voltage controller 1 is activated so that a constant voltage prevails at the output 3, even if the voltage on the main line 6 (BAT) varies, for example, because further consumers are connected to the main line 6.

The following disturbances will now be considered.

1. The voltage on the main line breaks down.
2. The voltage on the auxiliary line breaks down.
3. The voltages on the main and the auxiliary line break down.

When the voltage on the main line breaks down in the first case, the power input 2, through the diode 10 which is now conductive, is connected to the auxiliary line 9 by way of the line 8. Input 2 is now supplied with the voltage on the auxiliary line 9. This means practically that the buffer time for the power input 2 becomes an 'infinite' value in this case because the supply of the power input 2 is effected by way of the auxiliary line 9 which conducts a sufficient amount of voltage.

When the voltage on the auxiliary line 9 breaks down in the second case, the buffer capacitor 12 ensures that the signal input is supplied with a sufficient voltage for a relatively long period of time so that the voltage controller remains active. The long buffer time is the result of the dimensioning (large capacity) of the buffer capacitor with respect to the abovementioned third case and the high-ohmic condition of the signal input so that the voltage reduction at the capacitor occurs only slowly by way of the high-ohmic signal input.

When the voltage breaks down on the main line 6 as well as on the auxiliary line 9 in the third case, the buffer capacitor 12 ensures that a sufficient amount of voltage prevails at the power input of the voltage controller 1 at least for a certain discharge time. In this case, the buffer capacitor on the auxiliary line 9 will perform the function of the buffer capacitor which, according to the state of the art, is directly connected to the power input 2. Thus, the buffer capacitor 12 ensures buffering of the main line and buffering of the auxiliary line. The capacity of the buffer capacitor 12 is conformed to the necessary buffer time for the power input 2.

In the most unfavorable case, the above mentioned wiring permits achieving practically the same buffering as in the state of the art. In the event of voltage drop on the auxiliary line only, however, the voltage controller 1 remains much longer active than in the state of the art solution due to the much longer discharge time.

I claim:

1. An electrical system of an automotive vehicle, comprising:
    a main line that is connected to a vehicle battery,
    an auxiliary line that is connected to a positive pole of the battery by way of an ignition switch,
    a voltage controller that has a power input, a high-ohmic signal input, and an output, wherein the signal input is connected to the auxiliary line and the power input is connected to the main line by way of a diode, and wherein the power input is connected to the auxiliary line by way of a second diode which is conductive in the direction of the power input,
    a buffer capacitor connected to a joint junction point of the auxiliary line, the second diode, and the high-ohmic signal input so that the buffer capacitor buffers the input voltages on the signal input and on the power input, and wherein the capacity of the buffer capacitor is conformed to a buffer time necessary for the power input so that if the voltage breaks down on the main line or the auxiliary line, a sufficient amount of voltage is provided at the power input for a predetermined discharge time.

2. Electrical system as claimed in claim 1, further including a diode which is used to charge the buffer capacitor is provided in the auxiliary line.

3. The electrical system as claimed in claim 1, wherein the signal input includes a protective RC-filter.

* * * * *